Nov. 19, 1940.　　　J. E. KING ET AL　　　2,221,872
GRAPHIC RADIAL TRIANGULATION
Filed April 17, 1940　　　2 Sheets-Sheet 1

INVENTORS
JASPER E. KING
JOHN W. ELLIOTT
BY
ATTORNEYS

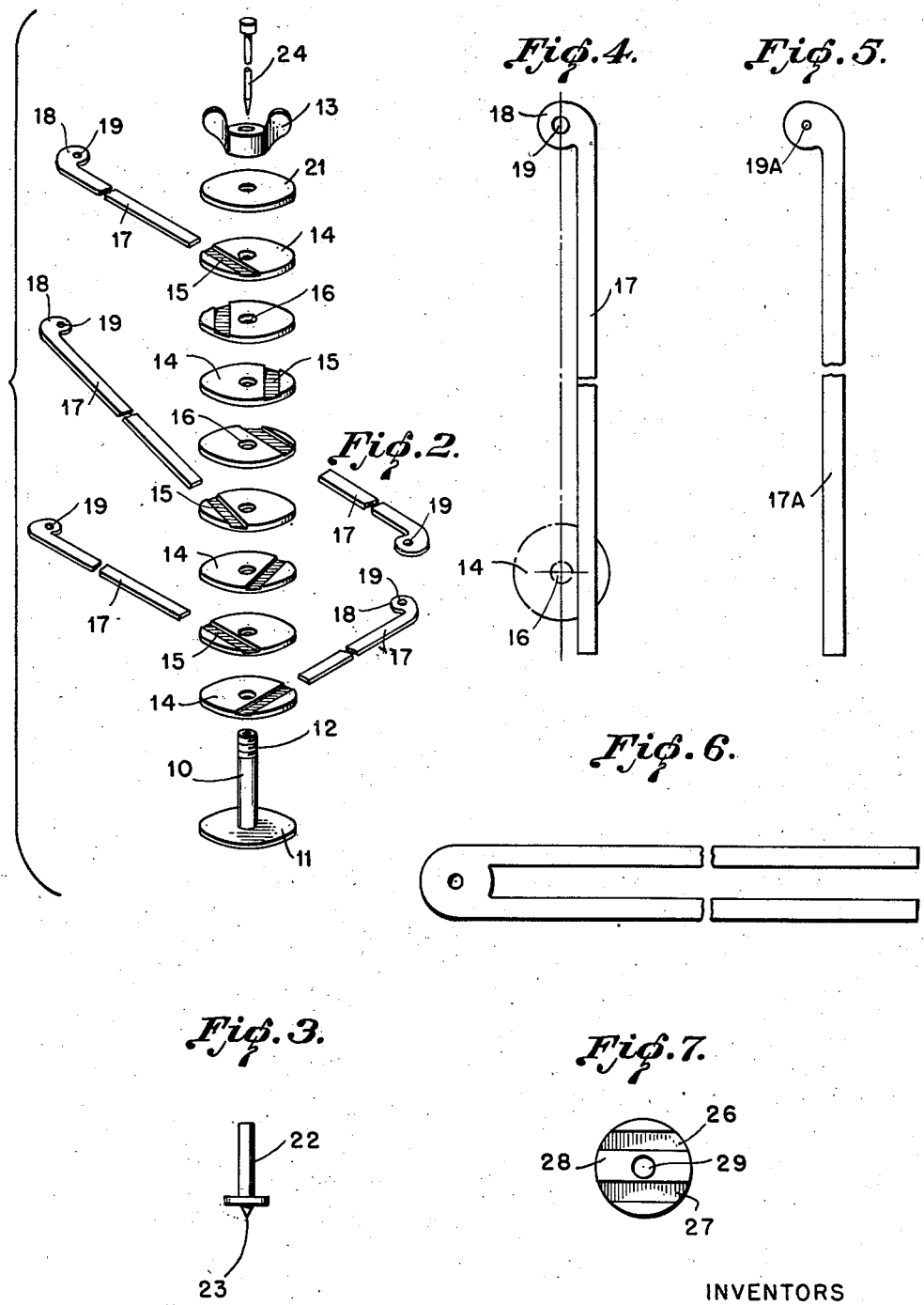

Patented Nov. 19, 1940

2,221,872

UNITED STATES PATENT OFFICE 2,221,872

GRAPHIC RADIAL TRIANGULATION

Jasper E. King and John W. Elliott, Denver, Colo., assignors to Henry A. Wallace, as Secretary of Agriculture of the United States of America, and his successors in office Application April 17, 1940, Serial No. 330,120

10 Claims. (Cl. 33—98)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the radial line method of making maps and is more particularly concerned with means for correcting the inherent errors of aerial photographs to a map projection of a predetermined scale representing the surface of the earth in order to compile a map from such pictures.

One of the principal objects of this invention is the provision of such means which are inexpensive, durable, and reuseable. Heretofore, the method known as the "slotted templet method" and other methods have been employed for this general purpose. However, these methods of the prior art have many disadvantages which the present invention obviates. All known methods, including the present method, are based upon the fundamental Arundel theory.

The slotted templet method which is described in U. S. Patent No. 2,102,612, dated December 21, 1937, and subsequent patents, employs a templet which is representative of a map area and in addition to representing such a map area, the templet comprises a plurality of radial slots and a center aperture, said apertures and slots together defining chosen central angles. These templets are interlocked by suitable mechanical guide means permitting the templets to be adjusted for the inherent errors in the individual map photographs. In this method, a templet must be prepared for each map unit of the series and, after the templets are assembled and a graphic solution obtained, they cannot be reused for other compilations or for the same compilation on a different scale and are generally discarded unless it is desired to keep them for the purpose of re-assembling the same series at the same scale. In addition to this disadvantage, in order to hold the cost of making the compilation to within a practical limit, the templets are generally fabricated of cardboard which wear very rapidly causing a great deal of lost motion in the assembly which is conducive of error. Also, the overlapping areas of the templets, in addition to the binding at the interlocked joints, result in such a great amount of friction that a proper adjustment is not generally possible with a large number of assembled templets. Furthermore, in making the templets, a machine for cutting the slots is necessary, the initial cost and operating expenses of which make it costly to use the method. Moreover, the templets, from the fact that they represent the map area as well as the central angles of the map, when assembled completely cover the entire map area so that when it is desired to transfer the reference points from the templet assembly to a map projection or base compilation sheet, with proper reference designations, a great deal of difficulty is encountered. The templets must be completely removed before the unidentified points can be designated for proper reference purposes. The slotted templet method as well as the present method depends upon the flexibility of the materials used to compensate for small errors due to tilt or tip. But in the slotted templet method the individual templet which as a result of excessive tilt or tip causes buckling in the assembly must be replaced while in the present method, the correction can be made by a simple adjustment automatically without making any replacements. In other words, where the flexibility of a slotted templet is insufficient to overcome a buckling effect it is necessary to remove the particular templet and substitute a corrected templet which will free the buckling. This removal of a templet in an assembly of interlocking templets is extremely difficult and laborious and involves the unassembling of a number of adjacent templets.

The present invention has for its purpose the provision of means for obviating the above deficiencies by reducing the friction of the assembly to a minimum, by permitting referenced points to be transferred to the map projection or base compilation sheet with extreme rapidity, ease, and without danger of error. Also, this method obviates the necessity of removing any unit from the assembly due to buckling occasioned by excess tilt or tip and permitting the adjustment to be made automatically.

In addition to the above advantages, the elements employed are reuseable for different scales and do not require a machine for cutting slots or making other prefabrications. The only cost involved is the initial cost of the elements.

The following description considered together with the accompanying drawings will disclose this invention more fully, its construction, arrangement, and combinations of parts and further objects and advantages thereof will be apparent.

In the drawings:

Figure 2 is an exploded isometric view of one of the central post assemblies with arms radiating therefrom, forming a spider unit.

Figure 3 is an elevational view of one of the connecting posts.

Figure 4 is a plan view of one form of radial arms.

Figure 5 is a plan view of a form of radial setting arm.

Figure 6 is a plan view of a modified form of radial arm.

Figure 7 is a plan view of a modified form of grooved disk for use with the modified radial arm shown in Figure 6.

Figure 1:
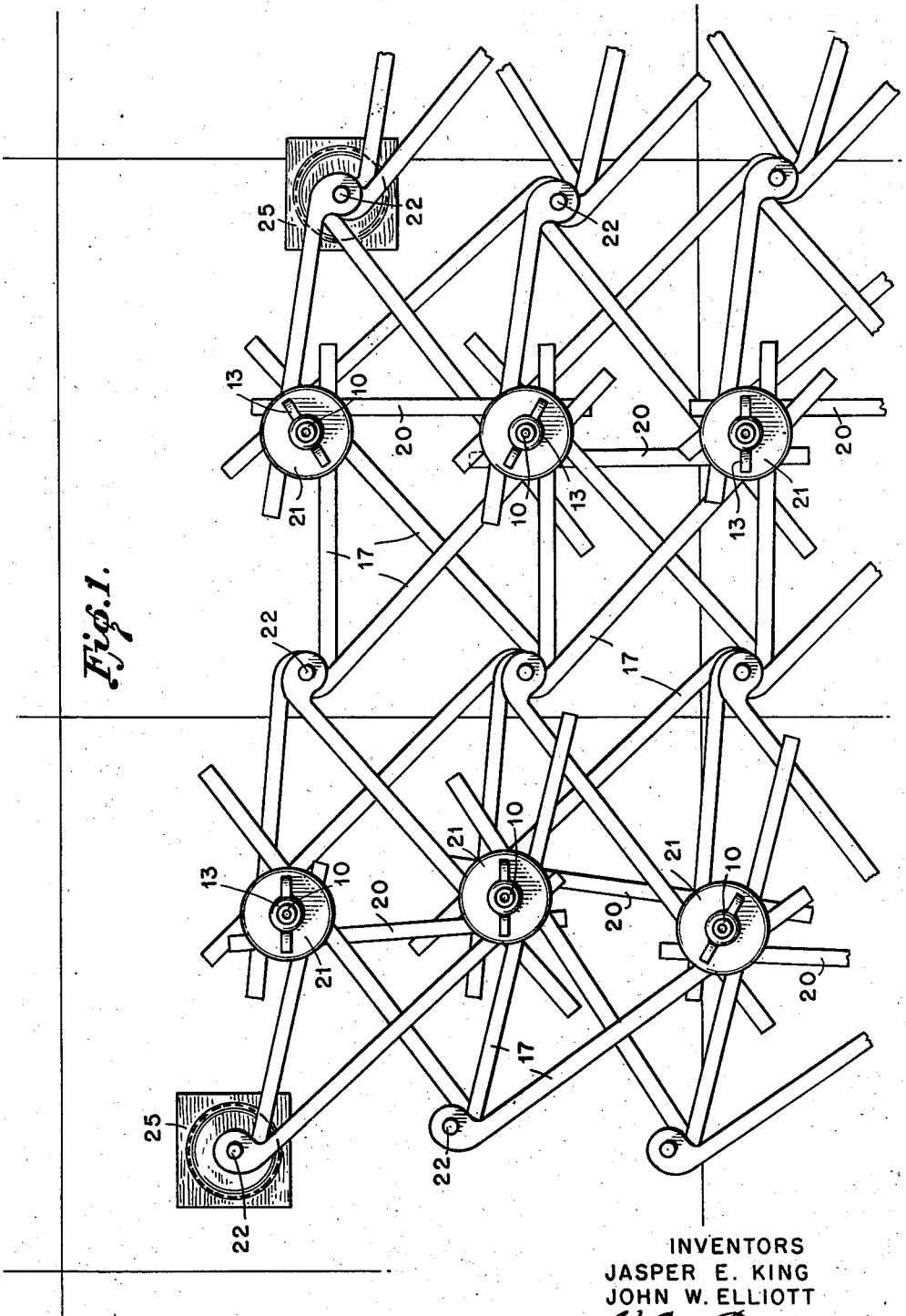
Figure 1 is an interlocked assembly illustrating the invention in one of its preferred forms over a map projection or base compilation sheet.

Referring with more particularity to the drawings in which like numerals designate like parts, the embodiment illustrated comprises a hollow post 10 having a flanged base 11 secured thereto. The upper portion of the post 10 carries threads 12 with which a wing nut 13 is normally associated. This post is adapted to receive a tier of grooved disks 14, the grooves 15 thereof being on one face only. The grooves 15 are disposed adjacent the central aperture 16 of each disk 14 and are adapted to engage slidably an arm 17 of brass, duraluminum, spring steel, or other suitable material having comparable stiffness. The depth of the grooves 15 is slightly greater than the thickness of the arm 17 but of substantially the same width so as to eliminate any lateral play. One end of each of the arms 17 is provided with an offset or neck portion 18 projecting laterally and having an aperture 19 therethrough, said aperture being so disposed that when the said arm is in slidable relation with a groove 15 the aperture 19 is on a line with the center of the disk 14 parallel to the arm 17. These offset arms are adapted for use in interlocking spider assemblies consisting of a center post 10 with the grooved disks 14 and 17 slidably associated therewith, the connection being made through the apertures 19 of said arms with suitable conjoining posts. In making direct connection between posts whereby one end of an arm is in the groove of a disk 14 on one post and the other end of the arm is aligned in a groove of another post, the neck 18 is not used and, therefore, a straight arm 20 is sufficient for the purpose.

In order to build up a graphic radial triangulation net from aerial photographs, each individual photograph is provided with a selected number of reference points, including basic reference points, one of which is the center of the photograph the other points radiating therefrom to define arbitrary central angles. The aerial photographs are of a series of consecutive overlapping areas, including the basic reference points. For each map so referenced, one post 10 is required representing the center point and one grooved disk 14 for each of the outlying points on the photograph. The post 10 is set on the main center point of the photograph and the required number of disks 14 are placed on the post. A plurality of arms 17, one for each disk 14, are then inserted in the respective grooves 15 of said disks and each arm is oriented so that its aperture 19 coincides with one of the outlying points of the photograph. This is facilitated by inserting pins through the aperture 19. A washer 21 is then placed over the tier of disks 14 and a wing nut 13 screwed over the top thereof to hold the disks in position, thereby fixing the angular positions of the grooves of the disks 14 and their corresponding associated arms 17. The arms 17 are now in a definite angular relation and are slidable in their corresponding grooves.

If it is desired to incorporate this spider unit in an assembly of the same scale or a different scale, the arms thereof are interlocked with arms of other spider units representing corresponding reference points. However, should it be desired to retain for future use the angular relation defined by the grooves in the disks, the arms 17 may be removed and the post with the assembled disks clamped by means of the washer 21 and wing nut 13 may be properly referenced and stored. When it is desired to use this assembly, the arms 17 are simply reinserted in the grooves of the disks.

In assembling the spider units, arms representing corresponding reference points are connected by means of posts 22 which posts are disposed through the apertures 19 of the arms. In order to facilitate transferring the position of these connecting posts 22 to the map projection or control base, stud pins 23 are centrally disposed on the bottom of each post so that it is only necessary to tap the top of each post lightly with a rubber mallet (not shown) or other suitable instrument to make an indentation on the base sheet. To fix the position of the center post a pin 24, having the same diameter as the bore of the hollow post 10, is placed through said bore and tapped lightly to make a mark on the sheet. If desired, the connecting post 22 may be made substantially the same as the hollow post 10 so that a pin can be placed therethrough for the purpose of making a reference mark on the sheet. Also the post 10 may be made similar to the post 22 with the stud pin arrangement.

In making the assembly, it is necessary to have established several fixed points, referred to as basic reference points, these points being arbitrary or permanent. In order to fix a post to the base sheet at such an established point a piece of adhesive tape 25 having a hole punched therethrough is placed over the particular post with the adhesive downward and it is pressed firmly against the flange of the post and the surrounding portion of the base sheet. If the base sheet is of metal, liquid soldering or some other form of temporary welding may be employed to fix the post to the sheet instead of the adhesive tape.

If desired, two types of radial arms may be employed, one type 17A having a pin hole 19A for use in preparing the center posts and the other type designated hereinbefore by the numeral 17 having a larger aperture 19 to accommodate the connecting posts 22 when assembled, the latter arms being substituted for the former after the center posts are prepared.

In Figures 6 and 7, a modified form of connecting arm and grooved disk, respectively, are illustrated. In this modified form the arm is U-shaped and engages two parallel grooves 26 and 27 of the modified disk 28, said groove straddling the center aperture 29 of the disk. The advantage of this modified arrangement is that it reduces the amount of bending effect which the off-center type of arm induces. A further advantage is that the U-shaped bar is symmetrical about its longitudinal axis as a result of which it can only be associated with the grooved disk in the proper relation. In the offset type of arm, the operator must be careful to place the arm in the groove of the proper disk so that the connecting aperture is in proper alignment with the center of the corresponding post. Also, due to the increased width of the arm, buckling effects, caused by excessive stresses, are more noticeable and errors causing buckling which would otherwise be unobserved, are more easily detected. When such buckling exists it is dissipated by loosening the wing nut 13 of the particular spider unit, which frees the arms of their fixed angular relations permitting them to assume a new angular relation without buckling. A fourth advantage of this type of arm is that due to the fact that the radius of gyration passes through the connecting aperture, any twisting of the arm will not cause the aperture to become displaced laterally from its normal position with respect to the center post.

In an assembly of spider units where one unit is moved relative to the other, the intermediate spiders are forced to move proportionately thereby readjusting themselves to the new condition imposed upon the system.

With an assembly of spiders as illustrated in Figure 1, it will be noted that the network is open so that the operator may reference any point of the assembly to the base sheet by placing designations thereon through the interstices of the network. Also, after the assembly is complete and the points of the stud pins or other pins have been transferred to the base sheet, the entire network may be slightly shifted so that the marks made on the sheet are adjacent the corresponding points of the network and the operator can simply make the proper reference designations on the points with respect to the adjacent network intersections.

Having thus described our invention, we claim:

1. A mechanical unit of the type mentioned comprising a vertical post having a flanged base, a tier of disks disposed on said base about said post, each disk having on one face a groove adjacent said post, means for clamping said disks in a fixed angular relation, each of said grooves being adapted to slidably engage a radial arm.

2. A mechanical unit of the type mentioned comprising a vertical post having a flanged base, a tier of disks disposed on said base about said post, each disk having on one face a groove adjacent said post, means for clamping said disks in a fixed angular relation, and a radial arm slidably engaged with each of said grooves.

3. In a graphic radial triangulation net of the type mentioned having radial arms, conjoining means for said arms comprising vertical posts, a tier of disks disposed about each of said posts, each disk having on one face a groove adjacent its respective post, means for clamping the disks of each post in a fixed angular relation, said grooves being adapted to slidably engage the radial arms of the net.

4. In a graphic radial triangulation net of the type mentioned having radial arms, conjoining means for said arms comprising hollow vertical posts, a tier of disks disposed about each of said posts, each disk having on one face a groove adjacent its respective post, means for clamping the disks of each post in a fixed angular relation, said grooves being adapted to slidably engage the radial arms of the net.

5. In a graphic radial triangulation net of the type mentioned having radial arms, conjoining means for said arms comprising vertical posts, a stub pin secured to the bottom of each post, a tier of disks disposed about each of said posts, each disk having on one face a groove adjacent its respective post, means for clamping the disks of each post in a fixed angular relation, said grooves being adapted to slidably engage radial arms of the net.

6. A mechanical assembly comprising a vertical post having a flanged base, a tier of disks disposed on said base about said post, each disk having on one face a pair of grooves straddling said post, means for clamping said disks in a fixed angular relation, the grooves of each disk being adapted to slidably engage a bifurcated radial arm.

7. In a graphic radial triangulation net of the type mentioned, having radial arms, conjoining means for said arms comprising a vertical post, a tier of disks disposed about said post, each disk having on one face a pair of grooves straddling said post, means for clamping said disks in a fixed angular relation, the grooves of each disk being adapted to slidably engage a bifurcated radial arm.

8. A mechanical assembly comprising a vertical post having a flanged base, a tier of disks disposed on said base about said post, said disks having grooves on one of their faces adjacent said post, means for clamping said disks in a fixed angular relation, said grooves being adapted to slidably engage radial arms when said disks are in a clamped relation.

9. A mechanical unit of the type mentioned representative of the central angles of a map area, having a post defining the main center point of said map area and radially adjustable arms defining the central angles of said map area, said arms having each an aperture radially aligned with said post, additional posts adapted to be passed through said apertures to connect said arms to the arms of a similar assembly, and stub pins secured to the bottom of each of said additional posts for making an identification mark on a supporting surface.

10. A mechanical unit of the type mentioned representative of the central angles of a map area, having a post defining the main center point of said map area and radially adjustable arms defining the central angles of said map area, said arms having each an aperture radially aligned with said post, and additional posts adapted to be passed through said apertures to connect said arms to the arms of a similar assembly, and means for anchoring any of said posts to a supporting surface.

JASPER E. KING.
JOHN W. ELLIOTT.